UNITED STATES PATENT OFFICE.

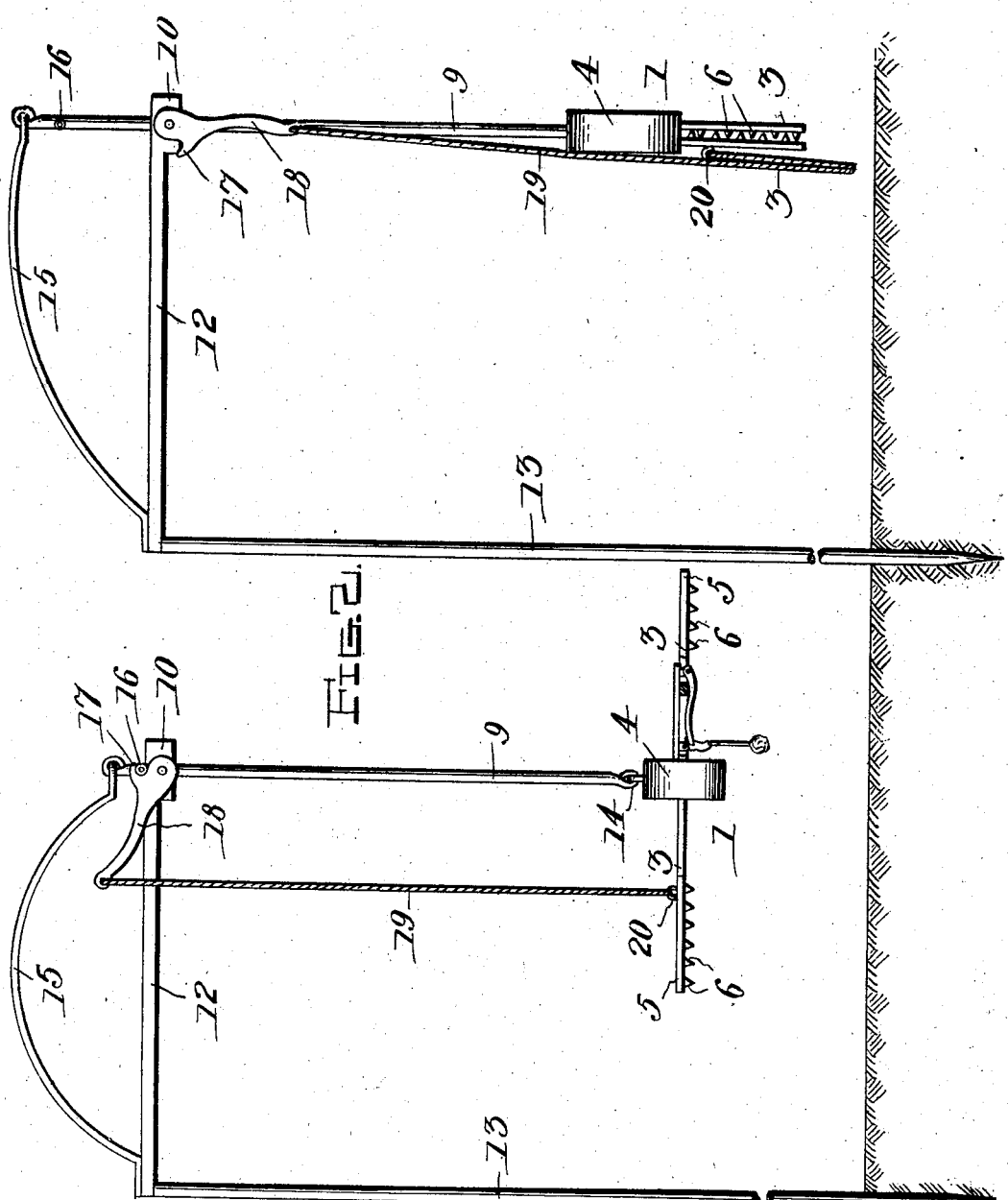

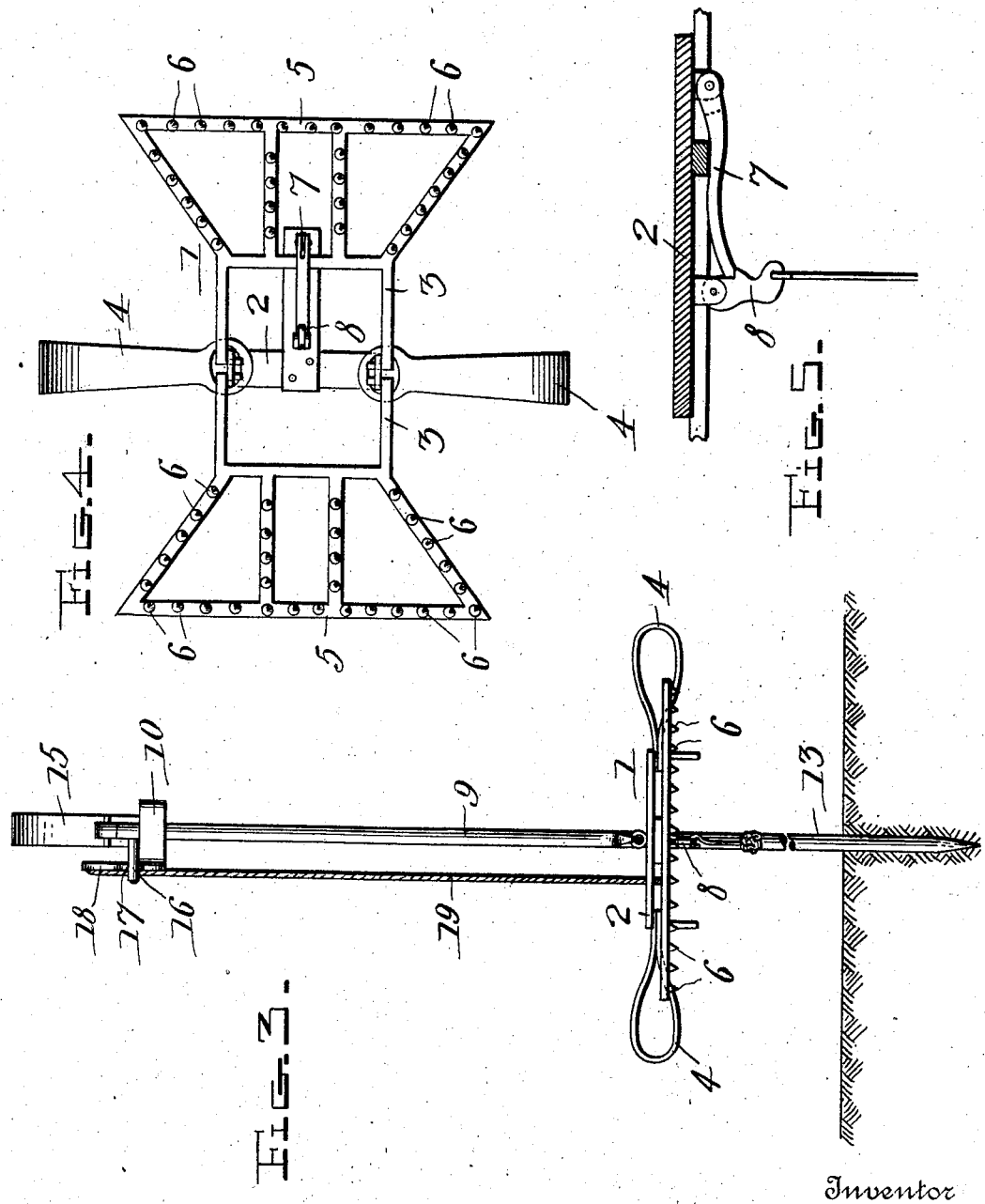

JOHN J. CROWSON, OF PECAN GAP, TEXAS.

ANIMAL-TRAP.

No. 827,215.

Specification of Letters Patent.

Patented July 31, 1906.

Application filed March 29, 1906. Serial No. 308,705.

*To all whom it may concern:*

Be it known that I, JOHN J. CROWSON, a citizen of the United States, residing at Pecan Gap, in the county of Delta and State of Texas, have invented certain new and useful Improvements in Animal-Traps; and I do declare the following to be a full, clear, and exact description of the invention, such as will enable others skilled in the art to which it appertains to make and use the same.

This invention relates to improvements in animal-traps.

The object of the invention is to provide an animal-trap of the spring-jaw type having means whereby the same may be suspended from a suitable support above the ground, so that the animal passes beneath the trap to reach the bait.

Another object is to provide a trap of this character having means whereby when the same is sprung by the animal said trap and the captured animal will be jerked upwardly and held in a suspended position above the ground.

With the above and other objects in view the invention consists of certain novel features of construction, combination, and arrangement of parts, as will be hereinafter described and claimed.

In the accompanying drawings, Figure 1 is a side elevation of the trap, showing the same in an open or set position. Fig. 2 is a similar view showing the same closed and in the position it occupies after being sprung. Fig. 3 is a front view of the trap in the position shown in Fig. 1. Fig. 4 is a detail plan view of the under side of the trap, showing the same in an open or set position; and Fig. 5 is an enlarged detail view of the catch for holding the jaws in an open position.

Referring more particularly to the drawings, 1 denotes the trap, which is here shown and is preferably in the form of a double spring-jaw trap comprising a supporting-frame 2, to which is pivotally connected gripping-jaws 3, adapted to be forcibly closed by double springs 4, which are engaged with the pivoted inner ends of the jaws in the usual or any desired manner. The jaws are here shown as having flaring or laterally-projecting outer portions 5, on the inner sides of which are formed teeth 6. The jaws are extended laterally, as at 5, in order to provide an increased gripping-surface, which will prevent or reduce the chances of the animal escaping from between the jaws when the trap is sprung.

The jaws 3 are held in an open or set position by means of a pivoted trigger 7. Said trigger may be of any suitable construction, but is here shown and preferably consists of a bar having a bifurcated or forked inner end adapted to be brought across a transversely-disposed bar of one of the jaws 3 when the same is in an open position and to be engaged with a suitable detent 8, to which the bait is connected and suspended within reach of the animal.

The trap is suspended in a suitable position above the ground by means of a supporting-rod 9, which is slidably mounted in the apertured head 10 of a horizontally-disposed arm 12, formed on or secured to the upper end of a stake or post 13, adapted to be driven into the ground, as shown.

The lower end of the rod 9 is connected to the trap by means of an eye 14, secured to the frame 2, as shown. The upper end of the rod 9 above the arm 12 is connected to the outer end of an elevated spring 15, the opposite end of which is connected to the upper end of the stake or post 13. On the rod 9, adjacent to the upper end thereof, is pivotally mounted a laterally-disposed roller 16, which when the rod 9 is forced downwardly to lower the trap in position is adapted to be engaged by a hook 17, formed on a releasing-lever 15, which is pivotally mounted on one side of the head 10. On the outer end of the lever 18 is secured the upper end of a releasing-cord 19, the lower end of which is connected to an eye 20 on one of the jaws of the trap, as shown. The length of the cord or rod 19 is such that when the trap is sprung and the jaws brought to a closed position the lever 18 will be rocked downwardly to disengage the hook 17 from the roller 16, thereby permitting the spring 15 to jerk the rod 9 and the trap upwardly, thus suspending the animal caught by the trap out of reach of the ground, in which position the animal will be unable to release itself from the trap.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention as defined by the appended claims.

Having thus described my invention, what I claim as new, and desire to secure by Letters Patent, is—

1. A trap of the character described, comprising a supporting-frame, spring-actuated gripping-jaws pivoted to said frame, a trigger to hold said jaws in an open or set position, a slidably-mounted supporting-rod connected to said trap, means to pull said rod upwardly and thereby elevate said trap, and means adapted to be released by the springing of the trap-jaws to hold said rod and trap in a lowered position, substantially as described.

2. A trap of the character described comprising a supporting-frame, spring-actuated gripping-jaws pivotally mounted on said frame, a trigger to hold said jaws in an open or set position, a supporting-post, a guide-arm projecting from said post, a supporting-rod slidably mounted in said arm, said rod being connected at its lower end to said trap, an elevating-spring connected to the upper end of said rod, a lever pivotally mounted on said arm, means formed on said lever to hold said rod and the trap in a lowered position, and means connected to the jaws of the trap whereby when the same are sprung said lever is actuated to release said rod and permit said spring to elevate the trap.

3. A trap of the character described comprising a supporting-frame, spring-actuated gripping-jaws pivotally mounted on said frame, a trigger to hold said jaws in an open or set position, a supporting-post, a guide-arm projecting from said post, a supporting-rod slidably mounted in said arm, said rod being connected at its lower end to said trap, an elevating-spring connected to the upper end of said rod, a lever pivotally mounted on said arm, a laterally-projecting roller pivotally mounted on said rod, a hook formed on said lever to engage said roller and thereby hold said rod and trap in a lowered position, a cord connected to the upper end of said lever, and to one of the jaws of said trap whereby when the latter is sprung, said lever will be actuated to disengage the hook thereon from the roller on said rod, thereby permitting said spring to elevate the trap, substantially as described.

In testimony whereof I have hereunto set my hand in presence of two subscribing witnesses.

JOHN J. CROWSON.

Witnesses:
H. A. BAKER,
J. H. BRIGHT.